United States Patent
Shih et al.

(10) Patent No.: US 6,413,389 B1
(45) Date of Patent: Jul. 2, 2002

(54) METHOD FOR RECOVERING METAL FROM ETCH BY-PRODUCTS

(75) Inventors: Hong Shih, Walnut; Danny Lu, Milpitas; Nianci Han; Li Xu, both of San Jose; Diana Ma, Saratoga, all of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/467,295

(22) Filed: Dec. 17, 1999

(51) Int. Cl.[7] ................................................ C02F 1/461
(52) U.S. Cl. ................................ 204/229.1; 204/230.1; 204/230.7; 204/272
(58) Field of Search ........................... 204/229.1, 230.1, 204/230.7, 272

(56) References Cited

U.S. PATENT DOCUMENTS 3,922,231 A  * 11/1975  Carlin et al. ................. 205/557
5,863,491 A     1/1999  Wang ........................... 266/101

FOREIGN PATENT DOCUMENTS

| JP | 62105922 | 5/1987 |
|----|----------|--------|
| JP | 8071303  | 3/1996 |

* cited by examiner

*Primary Examiner*—Arun S. Phasge
(74) *Attorney, Agent, or Firm*—Shirley L. Church; Kathi Bean; Joseph Bach

(57) ABSTRACT

A method and assembly for recovering a metal from by-products produced from etching a metal (e.g., platinum, iridium, aluminum, etc.) in a plasma processing chamber. The method includes recovering from the plasma processing chamber a deposit of the by-products containing the metal. The deposit is dissolved in an acid, and the metal is recovered from the acid by inserting a working electrode, a reference electrode, and a counter electrode into the acid and applying a difference in potential between the working and reference electrodes to cause current to flow through the working and counter electrodes and the metal to be removed from the liquid and deposit on the working electrode. The metal is removed from the working electrode to recover the metal. The assembly for recovering the metal from the by-products includes a potentiostat for effecting a difference in potential between the working and reference electrodes and causing current to flow through the working and counter electrodes in response to the difference in potential between the working and reference electrodes.

16 Claims, 8 Drawing Sheets

METHOD FOR RECOVERING METAL FROM ETCH BY-PRODUCTS

BACKGROUND OF THE INVENTION

1. Field of the Invention

This invention relates to a method for recovering metal from by-products deposited on the inside of a reactor chamber during processing (e.g., etching, chemical or physical vapor deposition, etc.) of a substrate in the reactor chamber containing a plasma. More specifically, this invention provides an electrochemical method for recovering metal (e.g., platinum, iridium, etc.) from deposits and/or byproducts formed and collected on an internal structure of a reactor chamber wherein substrates are being etched in a plasma of a processing gas.

2. Description of the Prior Art

It is well known that various magnetically enhanced radio frequency (RF) diodes and triodes have been developed to improve performance of plasma reactors. As mentioned in an article entitled "Design of High-Density Plasma Sources" by Lieberman et al from Volume 18 of "Physics of Thin Films", copyright 1994 by Academic Press Inc. of San Diego, Calif., these include by way of example only, the Applied Materials AMT-5000 magnetically enhanced reactive ion etcher and the Microelectronics Center of North Carolina's split cathode RF magnetron. Magnetically enhanced reaction ion etchers (MERIE) apply a dc magnetic field of 50–100 Gauss (G) parallel to the powered electrode which supports a semiconductor wafer. The dc magnetic field enhances plasma confinement, resulting in a reduced sheath voltage and an increased plasma density when the magnetic field is applied. However, the plasma generated in MERIE systems is strongly nonuniform both radially and azimuthally. It is well known that in order to increase process uniformity, at least azimuthally, the magnetic field is rotated in the plane of the semiconductor wafer at a certain frequency, e.g. 0.5 Hz. While this is an improvement, MERIE systems still do not have the desired uniformity and high density in the generated plasma, which may limit the applicability of MERIE systems to next-generation, submicron device fabrication.

The limitations of RF diodes and triodes and their magnetically enhanced variants have led to the development of reactors operating at low pressures with high-efficiency plasma sources. These reactors can generate a higher density plasma and have a common feature in that processing power (e.g. RF power and/or microwave power) is coupled to the plasma across a dielectric window, rather than by direct connection to an electrode in the plasma, such as for an RF diode. Another common feature of these reactors is that the electrode upon which the wafer is placed can be independently driven by a capacitively coupled RF source. Therefore, independent control of the ion/radical fluxes through the source power and the ion bombarding energy through the wafer electrode power is possible.

While the limitations of RF diodes and triodes and their magnetically enhanced variants have motivated the development of high-density plasma reactors with low pressures, high fluxes, and controllable ion energies, these developed high-density plasma reactors have a number of challenges. One challenge is the inability of high-density plasma reactors to achieve the required process uniformity over 200–300 mm wafer diameters. High density sources are typically cylindrical systems with length-to-diameter usually exceeding unity. In such cylindrical systems plasma formation and transport is inherently radially nonuniform.

Another challenge is that the deposition of materials on the dielectric window during etching of semiconductor wafers in a process chamber has necessitated frequent and costly reactor cleaning cycles. This is especially true when metals, such as platinum, copper, aluminum, titanium etc., are etched or deposited in the production of integrated circuit (IC) devices. After a metal layer on a substrate has been etched or deposited for a period of time, the etch or deposit rate on the metal may decrease. The dropping in metal etch or deposit rate is due to the build up of conductive by-products deposited on the dielectric window. Such deposited conductive by-products behave as a Faraday shield to reduce the efficiency of rf energy transmission into the plasma by blocking the rf energy transmission through the dielectric window. Thus, there is no stable power transmission into the plasma processing chamber; and there is no efficient power transfer across dielectric windows over a wide operating range of plasma parameters.

A further challenge is that the materials deposited on the inside of a process chamber from etching a conductive metal layer on a semiconductor wafer include metal emanating from the metal layer being etched. This results in a metal loss which is costly especially when the metal layer being etched includes one of the noble metals, such as platinum, palladium, iridium, rhodium, ruthenium, etc. Thus, not only does the deposition of materials on the inside of a process chamber resulting from etching of a metal layer produce conductive byproducts which reduce the efficiency of rf energy transmission and effect the etch rate of the metal layer being etched, but there is also the concomitant loss of metal that was etched from the metal layer.

Therefore, what is needed and what has been invented is a method for recovering metal from metal by-products deposited on the inside of a reactor chamber during processing of a substrate in a plasma reactor chamber. What is further needed and what has been invented is an electrochemical method for recovering metal from etch byproducts produced, by etching of the metal in a reactor chamber containing a plasma of the processing gas.

SUMMARY OF THE INVENTION

The present invention provides a method for recovering a metal, preferably a noble metal, from by-products produced in a plasma processing chamber comprising:

a) recovering from a plasma processing chamber a deposit or residue (e.g., by-products) containing a metal, preferably a noble metal such as platinum or iridium;

b) disposing (e.g., preferably by dissolving) the deposit including the metal in a liquid, such as an acid (e.g., hydrochloric acid and/or nitric acid) and water mixture; and c) recovering the metal from the liquid.

In a preferred embodiment of the present invention for the immediate foregoing method, the liquid preferably comprises an acid such as hydrochloric acid. In a preferred embodiment of the invention, the liquid comprises an acid (e.g. hydrochloric acid) plus another acid (nitric acid) and/or deionized water. In another preferred embodiment of the invention, the liquid comprises a $HNO_3:HCl:H_2O$ mixture to dissolve a metal rich deposition, such as a platinum rich deposition in which $Pt^{2+}$, $Pt^{4+}$ and metal Pt exist. A $HCl:HNO_3$ mixture having 3:1 mixing ratio by volume has been found acceptable, or a $HCl:HNO_3:H_2O$ mixture having a 2:1:1 mixing ratio by volume, or a 1:1:1 mixing ratio by volume, has also been found acceptable. In yet another preferred embodiment of the invention, the liquid comprises from about 0% vol. to about 40% vol. deionized water, from about 20% vol. to about 100% vol. hydrochloric acid (e.g. 37% by wt in deionized $H_2O$ concentrated hydrochloric acid with 12N concentration) and from about 0% vol. to about 60% vol. nitric acid (e.g. 67% by wt in deionized $H_2O$ concentrated nitric acid with 15N concentration). The recovering step (c) may preferably comprise inserting a working electrode into the liquid until the liquid reaches a first level on the working electrode, and passing a current through the working electrode. Subsequently, the working electrode may be further immersed into the liquid until the liquid reaches a second level on the working electrode, and the amount of current flowing through the working electrode may be increased. The second level on the working electrode is preferably higher than the first level on the working electrode such that the working electrode is deeper in the liquid. The immediate foregoing method preferably additionally comprises etching, prior to the recovering step (a), a layer of the metal in the plasma processing chamber to produce the deposit containing the metal. The current passing through the working electrode preferably ranges from about 0.2 amps to about 5.0 amps, and the increased current flow is such that total current flow preferably ranges from about 0.4 amps to about 10.0 amps; thus, the amount of current increase ranges from about 0.2 amps to about 5.0 amps. Beyond 2.0 amps, EGUG large current potentiostat can be used.

In a preferred embodiment of the present invention, the recovering step (c) in the above method may also preferably comprise depositing at a first rate the metal on a working electrode, and subsequently depositing at a second rate the metal on the working electrode with the second rate being higher than the first rate. The recovering step (c) includes removing the working electrode from the liquid, and removing the metal from the working electrode. Prior to removing the working electrode from the liquid, the recovering step (c) in the above method may further also preferably comprise selecting and maintaining a desired change in potential of a reference electrode with respect to a working electrode by causing a current to flow, in response to the selected desired change in potential, through the working electrode and through a counter electrode of a magnitude sufficient to effect the selected desired change in potential of the reference electrode with respect to the working electrode and cause the metal to be removed from the liquid and deposit on the working electrode. The magnitude of the current flowing through the working electrode and the counter electrode may be measured, as well as the difference in potential between the working electrode and the reference electrode.

According to standard electrode potentials in aqueous solutions at 25° C. in V vs. standard hydrogen electrode, the following reactions exist:

| | |
|---|---|
| $2H^+ + 2e = H_2$ | $E° = 0.00$ V. (SHE) |
| $Hg_2Cl_2 + 2e = 2Hg + 2Cl^-$ (sat'd. KCl) | $E° = {}^+0.2415$ V (SCE) |
| $Pt^{2+} + 2e = Pt$ | $E° = {}^+1.2$ V |
| $PtCl_4^{2+} + 2e = Pt + 4Cl^-$ | $E° = {}^+0.73$ V |
| $PtCl_6^{2-} + 2e = PtCl_4^{2-} + 2Cl^-$ | $E° = {}^+0.74$ V |

Since the actual electrolyte has higher acid concentration, the standard reduction potential of the solution after dissolving the deposition is +0.802V vs. SCE. The solution contains $Pt^{2+}$ and $Pt^{4+}$ as complex ions $PtCl_4^{2+}$ and $PtCl_6^{2+}$ after applying negative (cathodic) potentials in a range of −0.50V to −1.2V vs. SCE. Actually the applied potential difference vs. solution equilibrium potential +0.802 is at 1.302V to 2.002V. The larger the cathodic potential applied, the larger the cathodic current, and the higher the Pt deposition rate is.

The present invention also provides a method for recovering a metal, preferably a noble metal, from by-products produced in a plasma processing chamber comprising the steps of:

a) recovering from a plasma processing chamber a deposit (e.g., by-product residue) containing a metal, preferably a noble metal such as platinum or iridium;

b) disposing the deposit including the metal in a liquid;

c) inserting into the liquid of step (b) a first electrode, a second electrode and a third electrode;

d) applying a difference in potential (e.g., from about −0.5 volts to about −1.2 volts vs. saturated calomel electrode) between the first electrode and the second electrode to cause metal to deposit on the first electrode; and e) removing the metal from the first electrode.

In the immediate foregoing method, the disposing step (b) preferably comprises dissolving the deposit in the liquid, which comprises at least one acid and a pH of less than about 7.0 (e.g. preferably about 1.0 or less). The liquid additionally preferably comprises deionized water, and the at least one acid comprises hydrochloric acid and/or nitric acid. More specifically, the liquid preferably comprises from about 0% vol. to about 40% vol. deionized water, from about 20% vol. to about 100% vol. hydrochloric acid, and from about 0% vol. to about 60% vol. nitric acid. As previously indicated, the hydrochlorine and nitric acid typically are diluted with deionized water such that HCl is 37% by wt. in deionized $H_2O$ with a 12N and $HNO_3$ is 67% by wt. in deionized $H_2O$ with a 15N. The inserting step (c) preferably additionally comprises inserting the first electrode into the liquid until the liquid reaches a first level on the first electrode, and the applying step (d) causes a current to pass through the first electrode. This causes the metal to deposit and/or become adhered to the first electrode at a first rate.

The inserting step (c) also preferably additionally comprises inserting the first electrode into the liquid until the liquid reaches a second level on the first electrode, and increasing the amount of current flowing through the first electrode. This causes the metal to deposit and/or become adhered to the first electrode at a second rate, which preferably is greater than the first rate. The second level on the first electrode may be higher on the first electrode than the first level on the first electrode such that the first electrode is deeper in the liquid. The deposit is preferably obtained by etching a layer containing the metal in the plasma processing chamber. The method additionally preferably comprises increasing the difference in potential between the first electrode and the second electrode to cause the metal to be deposited on the first electrode at a second rate which is higher than said first rate. The increased difference in potential preferably ranges from about −0.5 volts to about −1.2 volts.

Another embodiment of the present invention provides an assembly for recovering a metal, preferably a noble metal, from by-products produced in a plasma processing chamber comprising a liquid, and by-products containing a metal, preferably a noble metal, removed from a plasma processing chamber and disposed in the liquid. An electrode assembly is also disposed in the liquid and includes a first electrode, a second electrode and a third electrode. A potential change selecting means (e.g., a potentiostat or the like) is electrically connected to the first electrode, to the second electrode, and to the third electrode for selecting and maintaining a desired change in potential of the second electrode with respect to the first electrode by causing a current to flow, in response to the selected desired change in potential, through the first electrode and the third electrode of a magnitude sufficient to effect the selected desired change in potential of the second electrode with respect to the first electrode, and cause the metal to be removed from the liquid and deposit on the first electrode. The assembly of this embodiment of the present invention additionally comprises a means (e.g., an ampmeter), electrically engaged to the first electrode, for measuring the magnitude of the current flowing through the first electrode. Preferably, the first electrode is a working electrode, the second electrode is a reference electrode, and the third electrode is counter electrode. The liquid comprises at least one acid.

Another embodiment of the present invention provides an assembly for recovering a metal, preferably a noble metal, from by-products produced in a plasma processing chamber comprising a liquid, and by-products containing a metal, preferably a noble metal, removed from a plasma processing chamber. An electrode assembly is also disposed in the liquid and includes a first electrode, a second electrode and a third electrode. A current selecting means (e.g. a potentiostat or the like) is electrically connected to the first electrode, to the second electrode, and to the third electrode for selecting and maintaining a desired current flow through the second electrode and the third electrode, and cause the metal to be removed from the liquid and deposit on the first electrode. The assembly of the present invention additionally comprises a difference in potential measuring means (e.g., a voltmeter) for measuring the magnitude of a difference in potential between the second electrode and the first electrode.

The foregoing provisions along with various ancillary provisions and features which will become apparent to those skilled in the art as the following description proceeds, are attained by this novel assembly and method, a preferred embodiment thereof shown with reference to the accompanying drawings, by way of example only, wherein:

DESCRIPTION OF THE PREFERRED EMBODIMENTS

Figure 1:
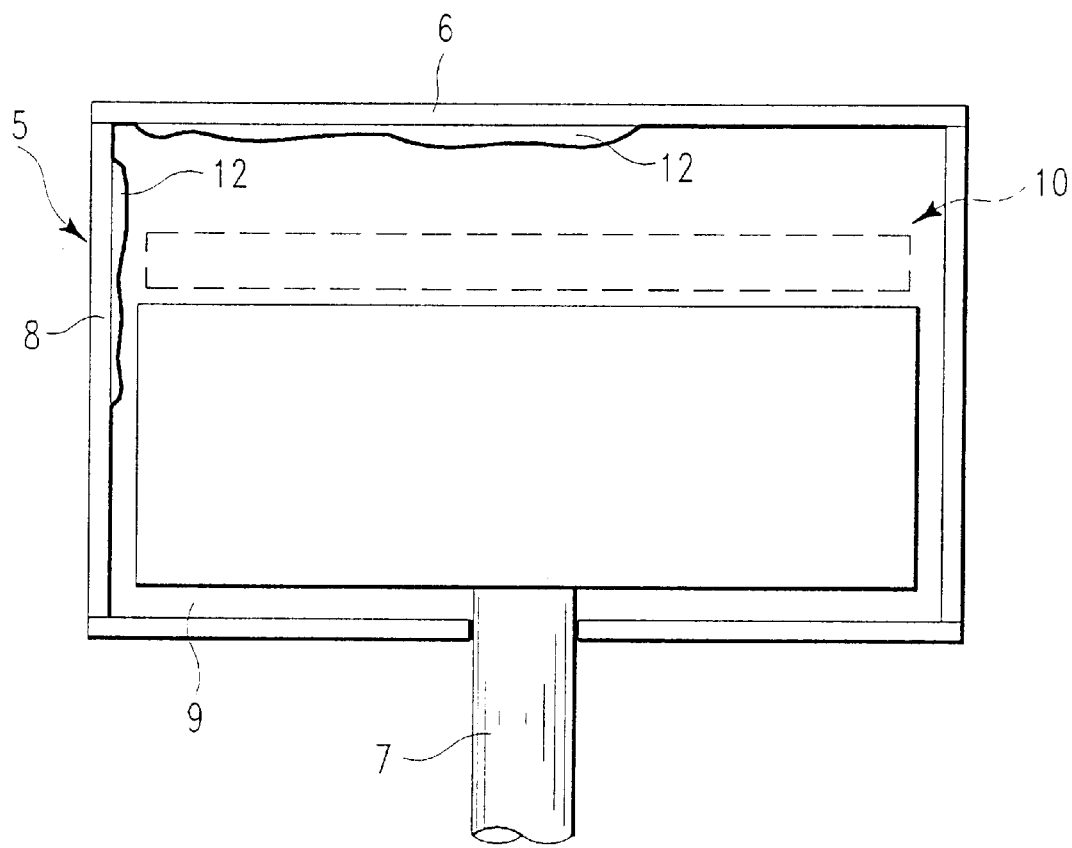
FIG. 1 is a schematic view of a process chamber wherein semiconductor wafers are processed in a plasma of a processing gas.
Figure 2:
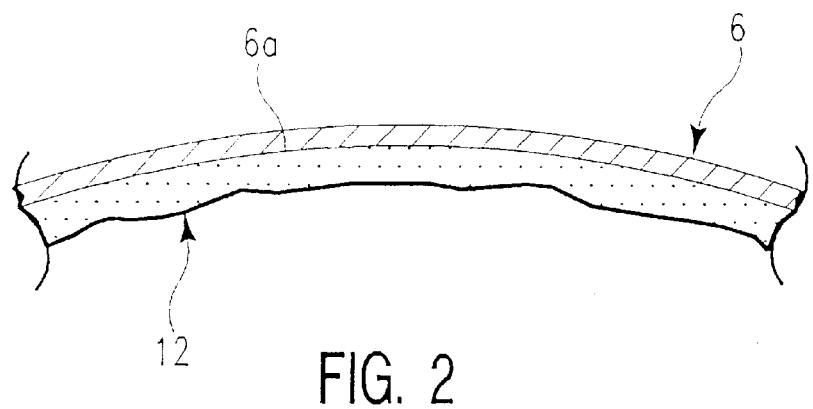
FIG. 2 is a partial vertical sectional view of a dome-shaped dielectric window having a residue deposited on the inside surface thereof.

Referring in detail now to the drawings, wherein similar parts of the invention are identified by like reference numerals, there is seen a process chamber, schematically illustrated as 5 in FIG. 1, including a chamber wall 8 enclosing a pedestal assembly, generally illustrated as 7, having a chuck assembly, generally illustrated as 9. The chuck assembly 9 supports a substrate, such as substrates or semiconductor wafers 10, while being processed within the process chamber 5, such as by plasma etching for patterning integrated circuit (IC) metal interconnect devices. Other forms of processing substrates which are included within the spirit and scope of the present invention include chemical vapor deposition and physical vapor deposition. During the plasma process, processing power (e.g., RF power, magnetron power, microwave power, etc.) passes through a dielectric member 6, which includes a dielectric window of a nonconductive material such as a ceramic dome (as shown in FIG. 2), etc., and becomes coupled to a plasma of the processing gas (e.g., Ar, $N_2$, $Cl_2$, etc.). If the plasma process is plasma etching, metal etching of metals (e.g. platinum, copper, aluminum, titanium, ruthenium, iridium, etc.) is conducted while being supported by substrates.

During plasma etching of a conductive layer (not shown) supported by the substrate 10, a deposit or residue 12 (as shown in FIG. 1) forms on the inside surface of the chamber wall 8 and/or on a surface 6a of the dielectric member 6 (as shown in FIG. 2) and/or on other structures (e.g., capture rings, etc.) within the process chamber 5. The residue 12 is located between the plasma and the power source, and is typically complex in that it contains etchants and reaction by-products, as well as inorganic materials. If the conductive layer that is being etched consists of a conductive metal (e.g., a noble metal, such as platinum, iridium, etc.), then the residue 12 would contain the conductive metal, as well as oxides and silicon-containing material, especially if a silicon-containing mask layer (e.g. a $SiO_2$ or $Si_3N_4$ mask layer) is employed during the conductive metal etch process. If the etchant gas contains a corrosive gas, such as a halogen (e.g. $Cl_2$) or a halogen-source gas (e.g. HBr, $BCl_3$, etc.), then the residue 12 would be a corrosive residue which may form corrosive salts and/or corrosive acids. For example, if the etchant gas comprises chlorine, which is one of the preferred gases for etching a conductive metal, then the residue 12 would contain corrosive chlorine which may react with moisture ($H_2O$) to form hydrochloric acid (HCl) that can permeate into the chamber wall 8 or any wall layer supported thereby and cause post-etch corrosion of the chamber wall 8 including any wall layer. If the conductive metal being etched consists of aluminum and the etchant gas comprises fluorine ($F_2$) or a fluorine source, then the residue 12 would include fluoride-containing compounds, such as aluminum trifluoride ($AlF_3$), ammonium fluoride ($NH_4F$), and aluminum oxyfluorides ($AlO_xF_y$) that would gradually build up upon the inner surface of the chamber wall 8 or upon any wall layer supported thereby. The method and assembly of the present invention may be employed for recovering any metal from the residue 12. Thus, the spirit and scope of the present invention is not to be limited to the recovery of any particular metal from the residue 12.

The process chamber 5 may be a processing zone or chamber of any type of plasma processing apparatus, such as an inductively coupled plasma reactor, which is currently used to perform various processes on semiconductor wafers including metal etching, dielectric etching, chemical vapor deposition, and physical vapor deposition, as some examples. While the method and assembly of the present invention may be employed for recovering any metal from residue 12 produced in the process chamber 5 from conducting any type of plasma processing on a semiconductor wafer, in a preferred embodiment of the present invention, the process chamber 5 is employed to etch a metal, preferably a noble metal such that the residue 12 is a deposit representing by-products produced from etching a noble metal, (e.g. one or more metals selected from the group consisting of platinum, palladium, iridium, rhodium, ruthenium, etc.). In an etch process, one advantage of an inductively coupled plasma is that a high density plasma ion density is provided to permit a large etch rate with a minimal plasma D.C. bias, thereby permitting more control of the plasma D.C. bias to reduce device damage. For this purpose, the source power applied to the inductive coil and the D.C. bias power applied to the wafer pedestal are separately controlled RF supplies. Separating the bias and source power supplies facilitates independent control of ion density and ion energy, in accordance with well-known techniques. Plasma in an inductive source is created by application of rf power to a non-resonant inductive coil, or a planar coil (not shown) for a close-coupled or planar source geometry, as shown and described on pages 52–53 of an article entitled "Design of High-Density Plasma Sources" by Lieberman et al from Volume 18 of *Physics of Thin Films,* copyright 1994 by Academic Press Inc. of San Diego, Calif. The application of rf power to a non-resonant inductive coil results in the breakdown of the process gas within a dielectric discharge chamber by the induced rf electric field which passes through the dielectric discharge chamber. Therefore, the coil inductor provides RF power which ignites and sustains the plasma of the processing gas.

Figure 3:
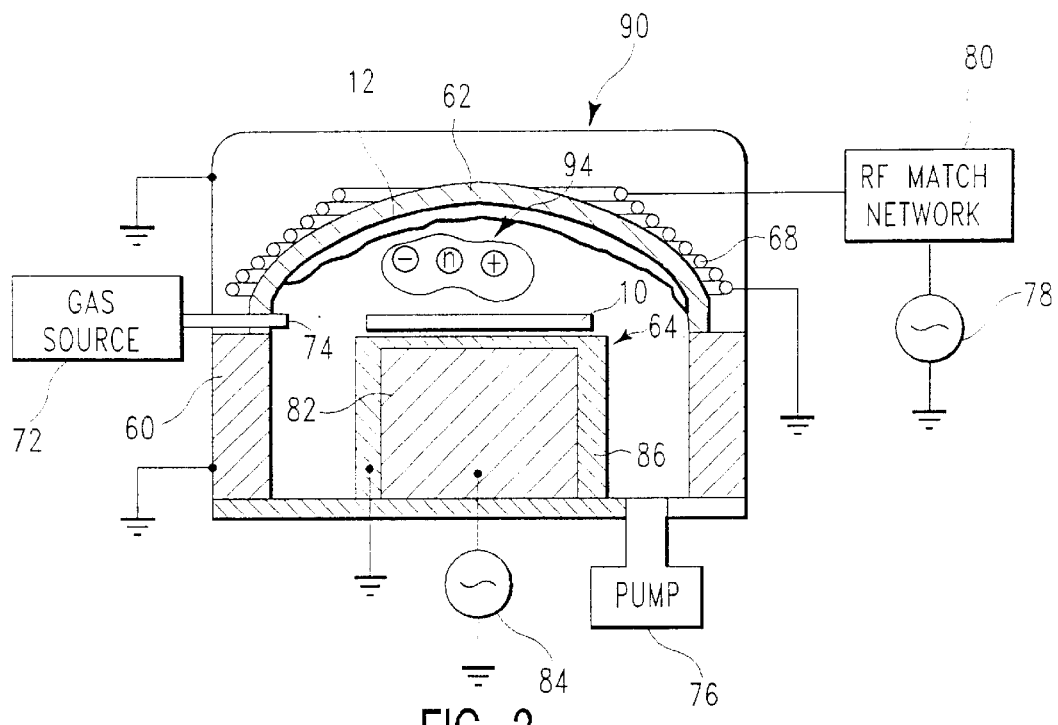
FIG. 3 is a simplified cut-away view of an inductively coupled RF plasma reactor which may be employed for etching a metal layer (e.g., a noble metal) to produce a semiconductor device and a residue containing metal that was etched from the metal layer.
Figure 4:
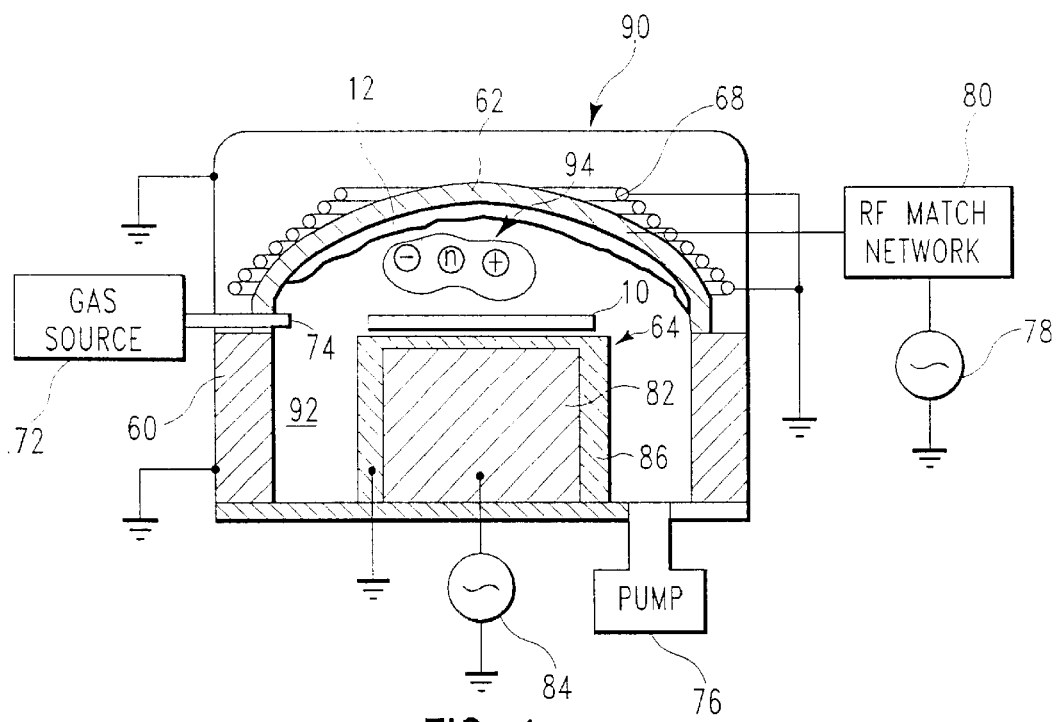
FIG. 4 is a simplified cut-away view of another inductively coupled RF plasma reactor which may be employed for etching a metal layer (e.g., a noble metal) to produce a semiconductor device and a residue containing metal that was etched from the metal layer.

A preferred inductively coupled plasma reactor for etching any type of metal, such as a noble metal, is that which inductively couples a plasma in a decoupled plasma source etch chamber sold under the trademark DPS™ owned by Applied Materials, Inc., 3050 Bowers Avenue, Santa Clara, Calif. 95054-3299. The DPS™ brand etch chambers decouples or separates the ion flux to the semiconductor wafer 10 from the ion acceleration energy and may be any of the DPS™ brand etch chambers of the inductively coupled plasma reactors disclosed in U.S. Pat. No. 5,753,044, entitled "RF PLASMA REACTOR WITH HYBRID CONDUCTOR AND MULTI-RADIUS DOME CEILING" and assigned to the present assignee and fully incorporated herein by reference thereto as if repeated verbatim immediately hereinafter. Referring now to FIGS. 3 and 4 for two (2) embodiments of an inductively coupled plasma reactor from U.S. Pat. No. 5,753,044 there is seen an inductively coupled RF plasma reactor generally illustrated as 90, having a reactor chamber, generally illustrated as 92, wherein a high density plasma 94 (i.e. a plasma having an ion density greater than about $10^9/cm^3$, preferably greater than about $10^{11}/cm^3$) of neutral (n) particles, positive (+) particles, and negative (−) particles are found. The spirit and scope of the present invention would include employing the method and assembly of the present invention for recovering a metal from a deposit or residue 12 produced in a reactor chamber having a low density plasma. The reactor chamber 92 has a grounded conductive cylindrical sidewall 60 and a dielectric ceiling 62. The dielectric ceiling 62 has the residue 12 on the undersurface thereof. The inductively coupled RF plasma reactor 90 further comprises a wafer pedestal 64 for supporting the (semiconductor) wafer 10 in the center of the chamber 92, a cylindrical inductor coil 68 surrounding an upper portion of the chamber 92 beginning near the plane of the top of the wafer 10 or wafer pedestal 64 and extending upwardly therefrom toward the top of the chamber 92, an etching gas source 72 and gas inlet 74 for furnishing an etching gas into the interior of the chamber 92, and a pump 76 for controlling the pressure in the chamber 92. The coil inductor 68 is energized by a plasma source power supply or RF generator 78 through a conventional active RF match network 80, the top winding of the coil inductor 68 being "hot" and the bottom winding being grounded. The wafer pedestal 64 includes an interior conductive portion 82 connected to the bias RF power supply or generator 84 and an exterior grounded conductor 86 (insulated from the interior conductive portion 82). Thus, the plasma source power applied to the coil inductor 68 by the RF generator 78 and the DC bias RF power applied to the wafer pedestal 64 by generator 84 are separately controlled RF supplies. Separating the bias and source power supplies facilitates independent control of ion density and ion energy, in accordance with well-known techniques. To produce high density plasma 94 as an inductively coupled plasma, the coil inductor 68 is adjacent to the chamber 92 and is connected to the RF source power supply or the RF generator 78. The coil inductor 68 provides the RF power which ignites and sustains the high ion density of the high density plasma 94. The geometry of the coil inductor 68 can in large part determine spatial distribution of the plasma ion density of the high density plasma 94 within the reactor chamber 92.

As illustrated in FIG. 4 the coil inductor 68 may be coupled to the RF power source 78, 80 in a mirror coil configuration that is known to those skilled in the art. In the mirror coil configuration of FIG. 4, the RF source 78, 80 is connected to the center winding of the coil inductor 68 while the top and bottom ends of the coil inductor 68 are both grounded. The mirror coil configuration has the advantage of reducing the maximum potential on the coil inductor 68.

Uniformity of the plasma density spatial distribution of the high density plasma 94 across the wafer 10 is improved (relative to conical or hemispherical ceilings) by shaping the ceiling 62 in a multi-radius dome and individually determining or adjusting each one of the multiple radii of the ceiling 62. The multiple-radius dome shape somewhat flattens the curvature of the ceiling 62 around the center portion of the ceiling 62, the peripheral portion of the ceiling 62 having a steeper curvature. As was previously mentioned, the curved undersurface of the ceiling 62 supports the residue 12 which contains a metal which may be recovered in accordance with the method and assembly of the present invention.

Figure 5:
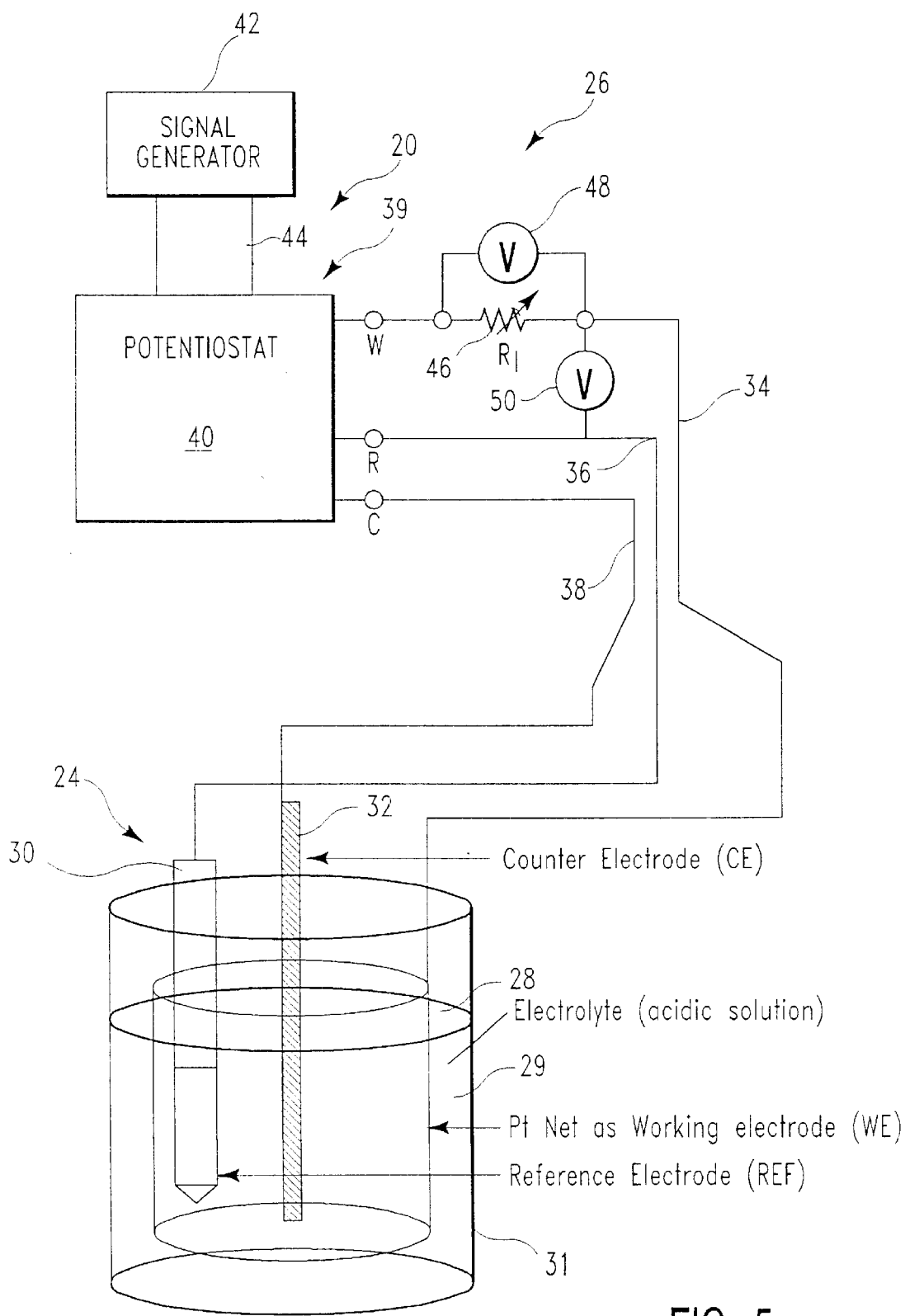
FIG. 5 is a schematic circuitry diagram for one embodiment of an assembly that recovers metal from an acidic solution having a dissolved deposit containing the metal.

Recovery of metal from the residue 12 may be by any suitable apparatus and/or by any suitable method. In a preferred embodiment of the present invention, an assembly, generally illustrated as 20 in FIGS. 5 and 6, is preferably employed for recovering metal from the residue 12. The assembly 20 includes an electrode assembly, generally illustrated as 24, and an electrical control assembly, generally illustrated as 26 and electrically coupled to the electrode assembly 24. The electrode assembly 24 includes a working electrode 28, a reference electrode 30, and a counter electrode 32. In the embodiment of the electrode assembly 24 depicted in FIGS. 5 and 6, working electrode 28 is shaped as a cylinder, typically formed from net or mesh, circumferentially surrounding the reference electrode 30 and the counter electrode 32, both of which are generally shaped as probes. The electrode assembly 24 is removably disposed in a liquid 29, preferably an electrolytic acidic solution, contained in a container 31. As will be further explained below for operation of the invention, liquid 29 contains dissolved residue 12.

Depending conductors 34, 36 and 38 as illustrated in FIG. 5 attach electrically to the working electrode 28, the reference electrode 30, and the counter electrode 32, respectively, and interconnect electrically a device, generally illustrated as 39, which is capable of delivering, applying, or transmitting to the electrode assembly 24, a constant voltage and/or a constant current. Preferably, device 39 comprises a potentiostat 40, which is conventional in design and a signal generator 42, which is also conventional in design. Signal generator 42 electrically engages the potentiostat 40 via conductors 44-44 for instructing or signaling a predetermined known current or amperage, or a predetermined known difference in potential or voltage, to the potentiostat 40 which transmits the same to the electrode assembly 24 through one or more of the conductors 34, 36 and 38, as will be explained hereafter. It should be understood that whenever "amperage" and "voltage" are referred to herein, "amperage" means current and "voltage" means difference in potential.

Variable resistor 46 can be connected in series within conductor 34. Voltmeter 48 is electrically attached across resistor 46, and in combination with the variable resistor 46, is an ampmeter to measure and determine the current through conductor 34. For example, if variable resistor 46 is set at 1 megohm, then under Ohm's Law, the readings of the voltmeter 48 in volts are identically current in microamps. Voltmeter 50 interconnects conductors 34 and 36 to measure the difference in potential between these two conductors. For the embodiment of the invention illustrated in FIG. 6A, the device 39 is a potentiost at 40$a$ having self contained therein the signal generator 42, the two voltmeters 48 and 50, as well as the variable resistor 46. Stated alternatively, the potentiostat 40$a$ in FIG. 6A includes the signal generator 42, voltmeters 48 and 50, and variable resistor 46, and appropriate knobs (not shown) for activating and/or controlling the same. Potentiostat 40$a$ may be purchased commercially from the Solartron Corp. under the product name Solartron 1287 Electrochemical Interface.

Liquid 29 may be any suitable liquid which is capable of dissolving and/or suspending the residue 12 therein and allowing metal to be recovered by the electrode assembly 24 and the device 39. In a preferred embodiment of the invention, liquid 29 is an electrolyte or an acidic solution having at least one acid and a pH of less than about 7.0, preferably less than about 3.0, more preferably equal to or less than about 1.0, such as from about 0.10 to about 1.00. Preferably, the acidic solution comprises, or consists of, or consists essentially of hydrochloric acid (HCl) or nitric acid ($HNO_3$). In one embodiment of the invention, the acidic solution is 100% by volume hydrochloric acid (preferably diluted HCl possessing a concentration of 37% by wt in deionized water with 12N) or 100% by volume nitric acid (preferably diluted $HNO_3$ possessing a concentration of 67% by wt. in deionized water with 15N). In another embodiment of the invention wherein the acid solution is a mixture of hydrochloric acid and nitric acid, the acid solution comprises, or consists of, or consists essentially of from about 50% by volume to about 95% by volume hydrochloric acid and from about 5% by volume to about 50% by volume nitric acid; more preferably from about 60% by volume to about 90% by volume hydrochloric acid and from about 10% by volume to about 40% by volume nitric acid; and most preferably from about 70% by volume to about 80% by volume hydrochloric acid and from about 20% by volume to about 30% by volume nitric acid. The normality of the respective HCl and $HNO_3$ acids for the embodiments of the present invention are preferably 12N and 15N respectively, with "normality" N, of the individual acids meaning containing one equivalent weight (q.v.) of a dissolved substance per liter of solution. Normality is a standard measure of concentration, well known to those skilled in the art.

In another preferred embodiment of the invention, liquid 29 comprises, or consists of, or consists essentially of at least one acid and water, preferably deionized water. More specifically, the liquid 29 comprises, or consists of, or consists essentially of from about 2% by vol. to about 50% by vol. deionized water and from about 50% by vol. to about 98% by vol. hydrochloric acid or nitric acid; more preferably from about 10% by vol. to about 40% by vol. deionized water and from about 60% by vol. to about 90% by vol. hydrochloric acid or nitric acid; and most preferably from about 20% by vol. to about 30% by vol. deionized water and from about 70% by vol. to about 80% by vol. hydrochloric acid or nitric acid. When the at least one acid is a mixture of hydrochloric acid and nitric acid, the liquid 29 comprises, or consists of, or consists essentially of from about 5% by vol. to about 35% by vol. deionized water and from about 30% by vol. to about 90% by vol. hydrochloric acid and from about 5% by vol. to about 35% by vol. nitric acid; more preferably from about 10% by vol. to about 30% by vol. deionized water and from about 40% by vol. to about 80% by vol. hydrochloric acid and from about 10% by vol. to about 30% by vol. nitric acid; and most preferably from about 14% by vol. to about 25% by vol. deionized water and from about 50% by vol. to about 72% by vol. hydrochloric acid and from about 14% by vol. to about 25% by vol. nitric acid.

The deposit or residue 12 may be added to and/or dissolved in the liquid 29 in any suitable amount depending on the constituency of the liquid 29. In one embodiment of the invention when the acidic solution is 100% by hydrochloric acid or 100% by wt. nitric acid, the residue 12 is added to and/or dissolved in the liquid 29 such that the liquid 29/residue 12 mixture comprises, or consists of, or consists essentially of from about 1% by wt. to about 15% by wt. residue 12 and from about 85% by wt. to about 99% by wt. hydrochloric acid or nitric acid; more preferably from about 2% by wt. to about 12% by wt. residue 12 and from about 88% by wt. to about 98% by wt. hydrochloric acid or nitric acid; and most preferably from about 4% by wt. to about 8% by wt. residue 12 and from about 92% by wt. to about 96% by wt. hydrochloric and/or nitric acid.

In a preferred embodiment of the invention wherein the liquid 29 comprises, or consists of, or consists essentially of a mixture of hydrochloric acid and nitric acid, the residue 12 is added to and/or dissolved in the liquid 29 such that the liquid 29/residue 12 mixture comprises, or consists of, or consists essentially of from about 1% by wt. to about 15% by wt. residue 12 and from about 70% by wt. to about 98% by wt. hydrochloric acid and from about 1% by wt. to about 15% by wt. nitric acid; more preferably from about 2% by wt. to about 12% by wt. residue 12 and from about 76% by wt. to about 96% by wt. hydrochloric acid and from about 2% by wt. to about 12% by wt. nitric acid; and most preferably from about 4% by wt. to about 8% by wt. residue 12 and from about 84% by wt. to about 92% by wt. hydrochloric acid and from about 4% by wt. to about 8% by wt. nitric acid.

In a preferred embodiment of the invention wherein the liquid 29 comprises, or consists of, or consists essentially of at least one acid and water, preferably deionized water, the residue 12 is added to and/or dissolved in the liquid 29 such that the liquid 29/residue 12 mixture comprises, or consists of, or consists essentially of from about 1% by wt. to about 15% by wt. residue 12 and from about 1% by wt. to about 15% by wt. deionized water and from about 70% by wt. to about 98% by wt. hydrochloric acid or nitric acid; more preferably from about 2% by wt. to about 12% by wt. residue 12 and from about 2% by wt. to about 12% by wt. deionized water and from about 76% by wt. to about 96% by wt. hydrochloric acid or nitric acid; and most preferably from about 4% by wt. to about 8% by wt. residue 12 and from about 4% by wt. to about 8% by wt. deionized water and from about 84% by wt. to about 92% by wt. hydrochloric acid or nitric acid. When the at least one acid is a mixture of hydrochloric acid and nitric acid, the residue 12 is added to and/or dissolved in the liquid 29 such that the liquid 29/residue 12 mixture comprises, or consists of, or consists essentially of from about 1% by wt. to about 15% by wt. residue 12 and from about 1% by wt. to about 8% by wt. deionized water and from about 61% by wt. to about 96% by wt. hydrochloric acid, and about 2% by wt. to about 16% by wt. nitric acid; more preferably from about 2% by wt. to about 12% by wt. residue 12 and from about 2% by wt. to about 6% by wt. deionized water, and from about 70% by wt. to about 92% by wt. hydrochloric acid and from about 4% by wt. to about 12% by wt. nitric acid; and most preferably from about 4% by wt. to about 8% by wt. residue 12 and from about 4% by wt. to about 6% by wt. deionized water and from about 76% by wt. to about 86% by wt. hydrochloric acid and from about 6% by wt. to about 10% by wt. nitric acid.

A difference in potential or voltage is transmitted by the device 39 (i.e., potentiostat 40, or the potentiostat 40a) to the reference electrode 30 and the working electrode 28 for maintaining a selected desired change or difference in potential of the working electrode 28 with respect to the reference electrode 30 and causing a current to flow, in response to the selected desired change in potential, through the working electrode 28, through the liquid 29, and through the counter electrode 32 of a magnitude sufficient to effect the selected desired change in potential of the working electrode 28 with respect to the reference electrode 30. The potentiostat 40 and signal generator 42, or the potentiostat 40a, also function as a current selector for selecting and maintaining a desired current flow through the working electrode 28, through the liquid 29, and through the counter electrode 32 when the electrode assembly 24 (i.e., the working electrode 28, the reference electrode 30, and the counter electrode 32) are in contact with the liquid 29. The difference in potential or voltage selected and maintained by the device 39 between the working electrode 28 and the reference electrode 30 may be any suitable difference in potential or voltage, preferably ranging from about −0.1 to about −4.0 volts, more preferably ranging from about −0.2 to about −3.0 volts, and most preferably ranging from about −0.5 to about −1.2 volts. The current flowing through the working electrode 28, through the liquid 29, and through the counter electrode 32 may be any suitable current or amperage; preferably ranging from about 0.1 to about 5.0 amps, more preferably ranging from about 0.15 to about 5.0 amps, and most preferably ranging from about 0.2 to about 2 amps.

The working electrode 28 may be fabricated of any suitable conductive material or metal that is capable of removing, by having adhered to it, metal from the liquid 29 after the residue 12 has been added to and/or dissolved in the liquid 29. Preferably, the working electrode 28 is manufactured from ferrous metal, such as steel, including a low alloy carbon steel, or from the metal or metal alloy which is to be removed from the liquid 29/residue 12 mixture after the residue 12 has been admixed with and/or dissolved in the liquid 29. Typically working electrode 28 is in the shape of cylinder and is of net or mesh construction. The working electrode 28 may be formed from any other metal that is capable of conducting current and functioning as the working electrode 28 in the electrode assembly 24 and removing metal from the liquid 29/residue 12 mixture by having the removed metal adhere to the working electrode 28. Preferably, the working electrode 28 comprises, consists of, or consists essentially of the metal (or metal alloy) which is being removed from the liquid 29/residue 12 mixture. More preferably, the working electrode 28 comprises, consists of, or consists essentially of, a noble metal; most preferably, platinum and/or iridium.

In operation of the working electrode 28, the working electrode 28 is initially inserted into the liquid 29 until the liquid 29 reaches a first level (e.g., level 33a in FIG. 6B) on the working electrode 28. A current of initial selection is allowed to pass through the working electrode 28 in this initial posture. After an acceptable amount of metal has adhered to the working electrode 28 in its initial position within the liquid 29, preferably the immersed surface area of the working electrode 28 is increased to expose more working-electrode surface underneath the liquid 29 for removing additional metal from the liquid 29/residue 12 mixture. In a preferred embodiment of the present invention, the surface area of the working electrode 28 is preferably increased by inserting the working electrode 28 into the liquid 29 until the liquid 29 reaches a second level (e.g., level 33b in FIG. 6C) on the working electrode 28. The second level is higher on the working electrode 28 than the first level such that the working electrode 28 is deeper in the liquid 29. In a preferred embodiment of the present invention, after the working electrode 28 has reached the second level 33b, the amount of current passing through the working electrode 28 is preferably increased such that the metal deposit rate on the working electrode 28 is increased from a first rate to a second rate. The amount of increase in current ranges from about 0.1 amps to about 5 amps, preferably from about 0.15 amps to about 3.0 amps, more preferably from about 0.2 to about 2 amps. Thus, the total current flowing after applying the current increase ranges from bout 0.2 to 10 amps, preferably from about 0.3 to 6 amps, or more preferably from about 0.4 to about 4 amps. The spirit and scope of the present invention would include additional embodiments of the present invention wherein the amount of current passing through the working electrode 28 is increased while the liquid 29 is at the first level (i.e., level 33a in FIG. 6B) or any other level, or wherein the amount of current flowing through the working electrode 28 is decreased while the liquid 29 is at the first level on the working electrode 28 and/or at the second level on the working electrode working electrode 28, all for controlling the rate of deposit of the metal on the working electrode 28. The rate of deposit on the metal of the working electrode 28 is a function of not only the amount of current passing through the working electrode 28 and the immersed surface area on the working electrode 28 which is available for receiving the metal deposit from the liquid 29, but also of the concentration of the dissolved residue 12 within the liquid 29. As the concentration of the residue 12 within the liquid 29 decreases, the rate of deposit of metal on the working electrode 28 decreases, depending on the available surface area on the working electrode 28 which is capable of receiving the metal deposit and the amount of current passing through the working electrode 28.

Reference electrode 30 may be fabricated of any suitable conductive material or metal that is capable of functioning as a reference electrode for the electrode assembly 24. Although calomel (i.e., saturated calomel) has been proven suitable for use as a reference electrode 30 in the method and assembly of the present invention, the theory of the technique indicates that other metals and metal alloys, e.g., low alloy carbon steel, hydrogen, copper-copper sulfate, silver-silver chloride, and aluminum copper, brass, lead, nickel, titanium, zirconium, chromium, and alloys thereof, may be used under similar conditions.

The counter electrode 32 may also be fabricated of any suitable material or metal that is capable of functioning as a counter electrode for the electrode assembly 24. It is preferably inert, especially in acid; that is, fabricated of a material such as carbon, graphite, or an inert noble metal such as platinum which undergoes no reaction under the application of an electric potential when exposed to the liquid 29. In this manner, contamination of the liquid 29 with undesired reaction products is avoided.

Within continuing reference to the drawings for operation of a preferred embodiment of the present invention for recovering metal from by-products produced in a plasma processing chamber, residue 12 is removed from a plasma processing chamber, such as the process chamber 5 (see FIGS. 1 and 2) or reactor chamber 92 (see FIGS. 3 and 4), and is admixed with liquid 29. The liquid 29 may be one of the previously mentioned preferred embodiments of the liquid 29. If the liquid 29 is an acid or mixed acid solution, it is preferably stored (e.g., in plastic bottles for 1 to 2 weeks) after the residue 12 has been admixed with and/or dissolved in the acidic liquid 29. Storing of the liquid 29/residue 12 mixture ensures that the residue 12 has had a chance to completely dissolve and/or disperse within the liquid 29 to assist in the separation and dispersion of the metal ions within the acidic liquid 29/residue 12 mixture. When the recovery of the metal from the acidic liquid 29/residue 12 mixture is desired, the acid liquid 29/residue 12 mixture is poured into a container, such as container 31. The acidic liquid 29/residue 12 mixture is subsequently diluted with deionized water comprising, or consisting of, or consisting essentially of any one of the previously mentioned preferred embodiments of a liquid 29/residue 12/water mixture to produce an acidic liquid 29/residue 12/deionized water mixture.

Figure 6A:
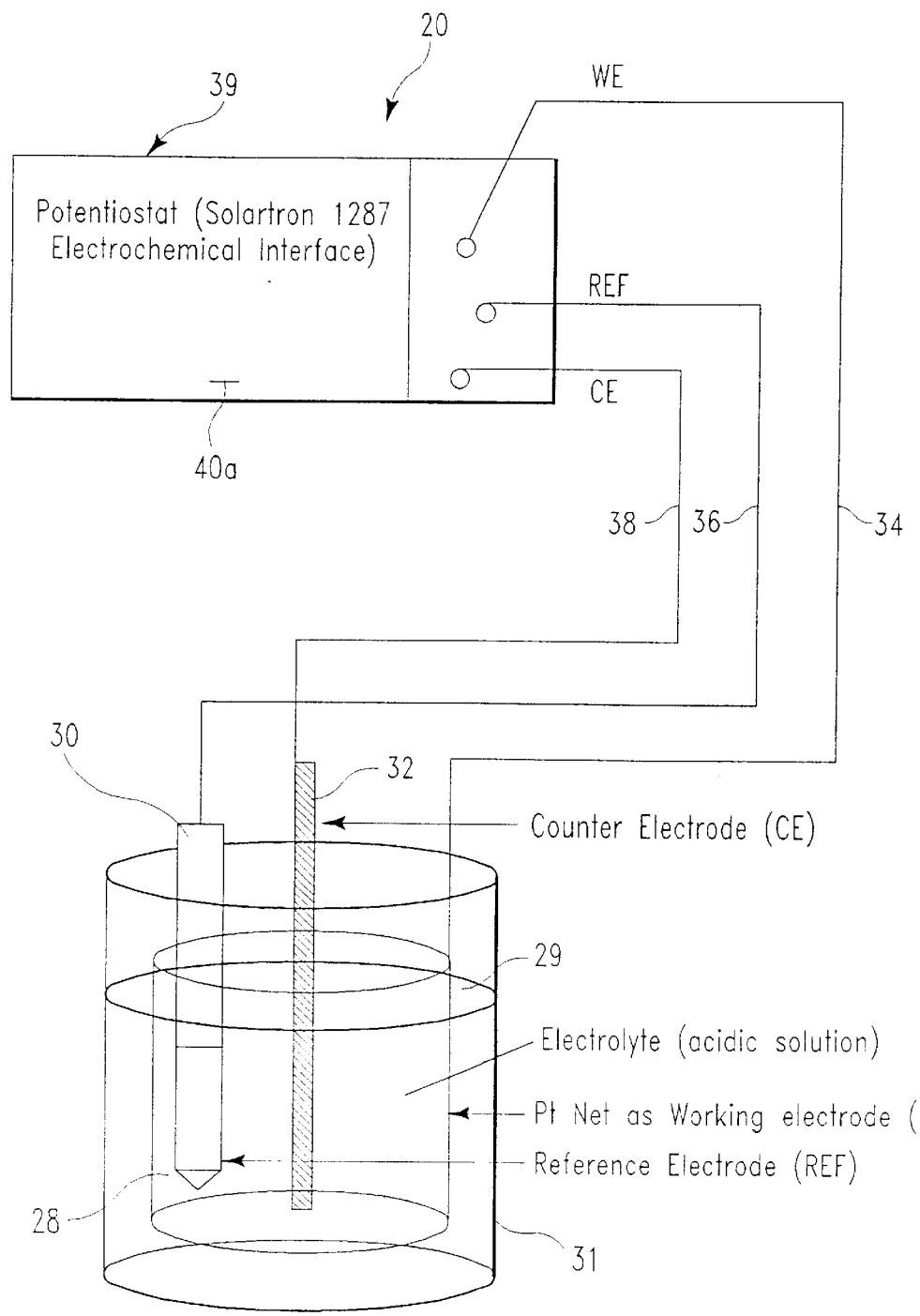
FIG. 6A is a schematic circuitry diagram for another embodiment of an assembly that recovers metal from an acidic solution having a dissolved deposit containing the metal.
Figure 6C:
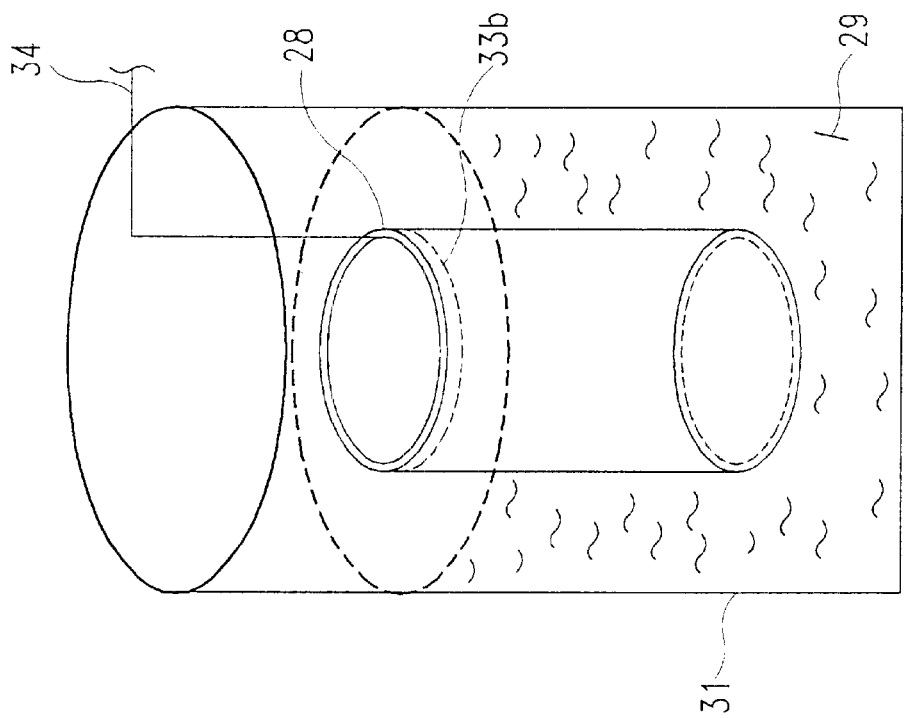
FIG. 6C is a perspective view of the working electrode disposed in the liquid such that the liquid is at a second level on the working electrode, wherein the second level on the working electrode is higher than the first level of FIG. 6B such that the working electrode is deeper in the liquid and the available area of the working electrode to receive metal from liquid is increased.
Figure 6B:
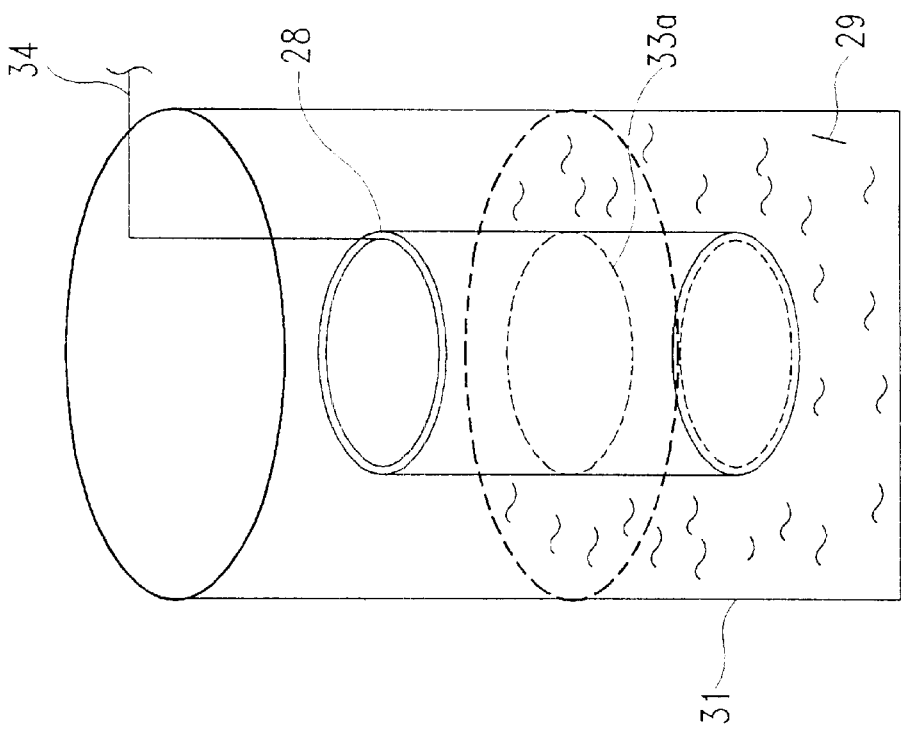
FIG. 6B is a perspective view of the working electrode disposed in the liquid such that the liquid is at a first level on the working electrode.

The device 39 (i.e., potentiostat 40a or potentiostat 40 and signal generator 42) is electrically coupled via depending conductors 34, 36, and 38 to the electrode assembly 24. The electrode assembly 24 is inserted into the liquid 29/residue 12/deionized $H_2O$ mixture within the container 31, as illustrated in FIGS. 5 and 6A, and until the liquid 29 reaches level 33a on the working electrode 28. After the foregoing procedure has been accomplished, the correct current scale for providing current flow through the working electrode 28, through the liquid 29, and through the counter electrode 32 is to be selected, along with selecting the resistance (i.e., measuring resistance) between working electrode 28 and the reference electrode 30.

To determine the resistance (i.e., measuring resistance) between the working electrode 28 and the reference electrode 30, a low voltage alternating current at high frequency (e.g., 0.4V at 1000 Hz) is applied to the working electrode 28. This and the reference electrode 30 are also made one arm of a four arm bridge circuit, identical in concept to a standard Wheatstone Bridge. The resistances of two of the other three arms are fixed. The resistance of the third arm is adjusted until the current passing across the bridge is a minimum. The value of this adjusted resistance is directly proportional to the unknown resistance between working electrode 28 and the reference electrode 30. The proportionality constant is provided by the manufacturer of the bridge and/or can be determined by direct calibration with known resistances in place of the electrochemical electrode assembly 24. If the value for this adjusted resistance is multiplied by the proportionality constant, the resistance between the working electrode 28 and the reference electrode 30 is determined or found.

A known applied current (e.g., in amps) or a known difference in potential (e.g., in volts), is then transmitted to the electrode assembly 24 by device 39. As was previously mentioned, this is preferably accomplished through the use of the potentiostat 40 and the signal generator 42, or potentiostat 40a. Using the potentiostat 40 and the signal generator 42 for exemplary purposes only, the known current, or the known difference in potential, is dialed into the signal generator 42 which transmits the same to the potentiostat 40. If a known applied current is dialed into the signal generator 42, the potentiostat 40 transmits this current as direct current through the depending conductor 34 including the variable resistor 46, through the working electrode 28, through the acidic liquid 29/residue 12/deionized $H_2O$ mixture and through the counter electrode 32 and subsequently back to the potentiostat 40 through depending conductor 38. The variable resistor 46 may possess any suitable value (e.g. 0.1 meg ohm to 1.5 meg ohm). The resistor 46 assists in measuring current. The electromotive force between the working electrode 28 and the reference electrode 30 is measured with voltmeter 50.

If a known difference in potential is dialed into the signal generator 42, the potentiostat 40 transmits and/or applies the difference in potential between the working electrode 28 and the reference electrode 30, including their associated depending conductors 34 and 36, respectively; more specifically, the difference in potential is applied through the depending conductor 34 including the variable resistor 46, through the working electrode 28, through the acidic liquid 29/residue 12/deionized $H_2O$ mixture and through the reference electrode 30 and back to the potentiostat 40 through the depending conductor 36. The current as direct current is being conducted, as the result of a difference in potential, through conductor 34 including the variable resistor 46, through the working electrode 28 through the acidic liquid 29/residue 12/deionized H$_2$O mixture and through the counter electrode 32 and back to the potentiostat 40 through the conductor 38. This current between the working electrode 28 and counter electrode 32 is measured by the meter 48/resistor 46.

As current at a desired amperage is being conducted through the working electrode 28, metal leaves the acidic liquid 29/residue 12/deionized water mixture and becomes adhered to the working electrode 28 at a rate of deposit. After a desired period of time (e.g., 10 to 30 mins.) when a suitable amount of metal has accumulated on the working electrode 28, the surface area of the working electrode 28 in contact with the acidic liquid 29/residue 12/deionized water mixture is increased by inserting or immersing the working electrode 28 deeper into the acidic liquid 29/residue 12/deionized water mixture such as, by way of example only, until the level of the mixture on the working electrode 28 moves from level 33a in FIG. 6B to level 33b in FIG. 6C. Preferably, the amount of current flowing through the working electrode 28 is subsequently increased by adjusting the device 39 accordingly. Typically, as the amount of current flowing through the working electrode 28 is increased, the rate of deposit of the metal on the working electrode 28 increases. After a desired period of time (e.g., 10 to 40 mins.) of increased current passing through the working electrode 28, the device 39 is turned off and the electrode assembly 24 is removed from the acidic liquid 29/residue 12/deionized water mixture. Metal may be recovered by removing it, such as by brushing or scraping it, from the surface of the working electrode 28.

The invention will be illustrated by the following set forth examples which are being given to set forth the presently known best mode by way of illustration only and not by way of any limitation. All parameters such as concentrations, mixing proportions, temperatures, pressure, rates, compounds, etc., submitted in these examples are not to be construed to unduly limit the scope of the invention.

EXAMPLE I

The plasma processing apparatuses for this Example were the following: Oxide Etch MxP Centura™, and a Metal Etch DPS Centura™ brand plasma processing apparatus possessing a DPS™ brand chamber, all sold by Applied Materials Inc., 3050 Bowers Avenue, Santa Clara, Calif. 95054-3299. The DPS™ brand chamber included an etch chamber and a generally hemispherical shaped dome as shown in FIGS. 3 and 4 manufactured of a dielectric aluminum oxide that was capable of allowing RF power to pass therethrough for being coupled to a plasma of an etchant gas. The hemispherical shaped dome covered the etch chamber as a lid as represented in FIGS. 3 and 4 and sealed the chamber for pumping down to mTorr vacuum pressure. Capture rings were employed for holding the semiconductor wafers in place. The inductive coils circled the outside of the hemispherical shaped dome and connected to a RF power supply. RF power energy delivered to the inductive coils were transmitted through the hemispherical shaped dome and into the DPS™ brand chamber and generated a high density plasma from a processing gas for processing semiconductor wafers.

A plurality of test semiconductor wafers were formulated with each wafer having the following film stack:

0.7 μm patterned PR (photoresist)/2500 Å Oxide/300 Å TiN/1500 Å Pt/100 Å TiN

The oxide hard mask (i.e., the mask layer) of each wafer was opened in the oxide etch chamber of a plasma processing apparatus sold under the trademark Oxide Etch MxP Centura™, owned by Applied Materials Inc., 3050 Bowers Avenue, Santa Clara, Calif. 95054-3299. The etchant gas for opening the oxide hard mask comprised about 70% by volume Ar and about 30% by volume CHF$_3$. The reactor and process conditions were as follows:

| Reactor Conditions | |
|---|---|
| Pressure | 60 mTorr |
| RF Power | 850 watts |
| Rotational Magnetic Field | 40 Gauss |
| Temperature of Test Wafers | 100° C. |
| Oxide Mask Etch Rate | 3000 Å/min |
| Process Conditions Based on the Flow Rate of Ar and Cl$_2$ | |
| CFH$_3$ | 50 sccm |
| Ar | 100 sccm |
| Pressure, mTorr | 60 mTorr |
| RF Power Density | 850 watts |
| Temperature (° C.) of Test Wafers | 100° C. |
| Oxide Mask Etch Rate (Å/min) | 3000 Å/min |
| Magnetic Field (Gauss) | 40 Gauss |

The photoresist of each of the semiconductor wafers was stripped from the oxide hard mask in an ASP chamber of the Metal Etch MxP Centura™ brand plasma processing apparatus under the following recipe using microwave downstream O$_2$/N$_2$ plasma: 120 seconds, 250° C., 1400 W, 3000 sccm O$_2$, 300 sccm N$_2$, and 2 Torr.

The TiN protective layer of each of the semiconductor wafers was etched with Ar and Cl$_2$ as the etchant gases and in a DPS™ brand chamber of the Metal Etch DPS Centura™ brand plasma processing apparatus under the following reactor and process conditions:

| Reactor Conditions | |
|---|---|
| Pressure | 7 mTorr |
| RF Power to Coil Inductor | 900 watts |
| RF Power to Water Pedestal | 100 watts |
| Temperature of Test Wafers | 110° C. |
| TiN Etch Rate | 2000 Å/min |
| Process Conditions Based on the Flow Rate of Ar and Cl$_2$ | |
| Ar | 25 sccm |
| Cl$_2$ | 50 sccm |
| Pressure | 7 mTorr |
| RF Power to Coil Inductor | 900 watts |
| RF Power to Water Pedestal | 100 watts |
| Temperature of Test Wafers | 110° C. |
| TiN Etch Rate | 2000 Å/min |

The platinum layer of the plurality of test semiconductor wafers was then etched with Ar and Cl$_2$ as the etchant gases and in a DPS™ brand chamber of the Metal Etch DPS Centura™ brand plasma processing apparatus under the following reactor and process conditions:

| Reactor Conditions | |
|---|---|
| Pressure | 7 mTorr |
| RF Power to Coil Inductor | 750 watts |
| RF Power to Water Pedestal | 400 watts |
| Temperature of Test Wafers | 120° C. |

-continued

| | |
|---|---|
| Platinum Etch Rate | 2000 Å/min |
| Process Conditions Based on the Flow Rate of Ar and $Cl_2$ | |
| Ar (50% by vol.) | 50 sccm |
| $Cl_2$ (50% by vol.) | 50 sccm |
| Pressure mTorr | 7 mTorr |
| RF Power to Coil Inductor | 750 watts |
| RF Power to Water Pedestal | 400 watts |
| Temperature (° C.) of Test Wafers | 120° C. |
| Pt Etch Rate (Å/min) | 2000 Å/min |
| Selectivity of Pt/Oxide Hard Mask | 2:1 |

Figure 10:
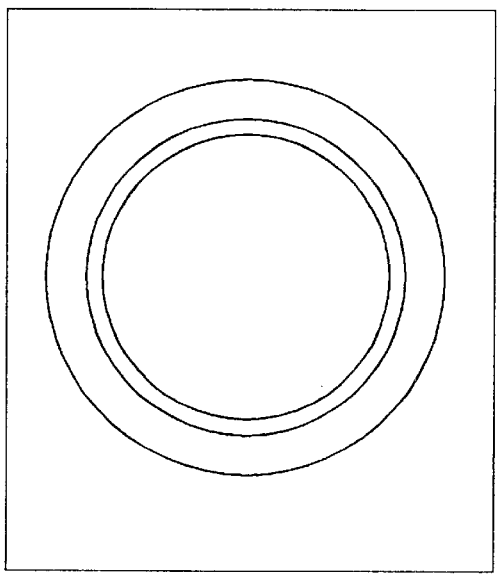
FIG. 10 is a top plan view of the capture or focus ring of FIG. 8 after removal (by dissolving in a liquid) of the deposition from the surface thereof.
Figure 11:
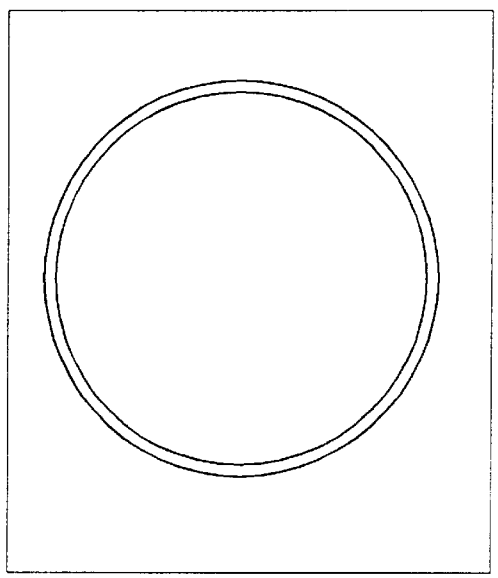
FIG. 11 is a top plan view of the ceramic dome of FIG. 9 after removal (by dissolving in a liquid) of the deposition from the inside surface.
Figure 8:
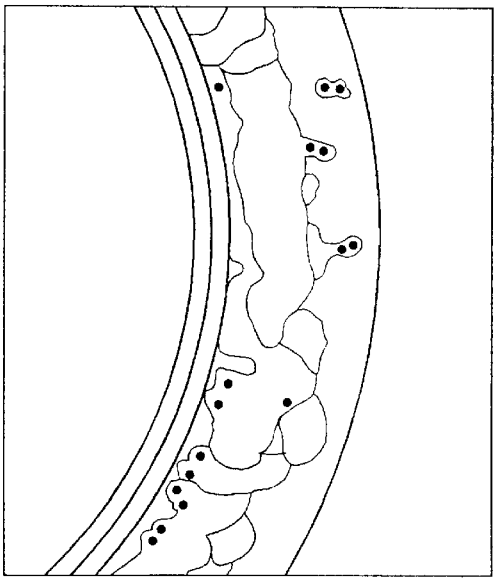
FIG. 8 is a partial top plan view of the capture or focus ring of Example I having a deposition (e.g. a platinum complex deposition) thereon from etching platinum.
Figure 9:
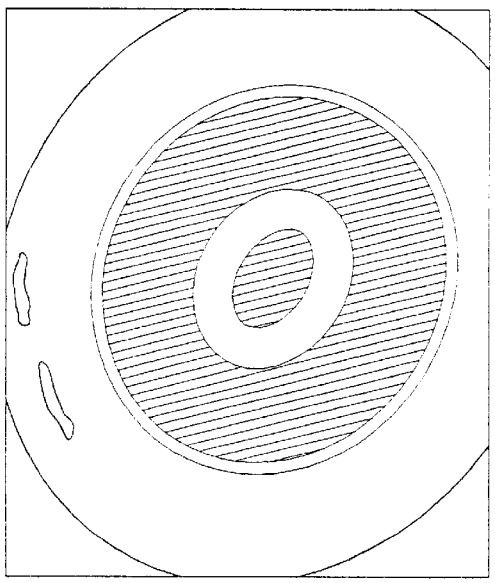
FIG. 9 is a top plan view of the ceramic dome of Example I containing on the inside surface supporting a deposition (e.g. a platinum complex deposition) from etching platinum.

The hemispherical dome of the DPS™ brand chamber was subsequently opened and Pt etch by-products were discovered on the inside surface of the dome and on the capture rings which held the plurality of semiconductor wafers in place. FIG. 8 is a partial top plan view of one of the capture or focus rings having a Pt deposition (i.e., Pt etch by-products) thereon from etching platinum. FIG. 9 is a top plan view of the ceramic dome containing the Pt deposition (i.e., Pt etch by-products) on the inside surface of the dome. The Pt etch by-products were removed from the inside surface of the dome and from the capture rings and subsequently dissolved in an acidic liquid comprising 50% by volume hydrochloric acid and 50% by volume nitric acid. Platinum ions existed as $Pt^{2+}$ and $Pt^{4+}$ in the solution. Complex ions such as $[PtCl_4]^{2-}$ and $[PtCl_5]^{2-}$ were also in the solution. FIG. 10 is a top plan view of the capture or focus ring after removal of the Pt etch by-products. FIG. 11 is a top plan view of the ceramic dome after removal of the Pt etch by-products.

The assembly 20 of FIG. 6A was subsequently employed to recover platinum. The device 39 was a potentiostat sold commercially under the product name Solartron 1287 Electrochemical Interface by the Solartron Corp. It possessed a 2 A current scale. The working (cathode) electrode 28 was manufactured from platinum and had an initial weight of abut 1.655565 g. The reference electrode 30 and counter electrode 32 were respectively fabricate from saturated calomel (i.e. mercurous chloride, $Hg_2Cl_2$) and graphite. By considering the standard reduction-oxidation potential, the saturated calomel reference electrode (SCE) used had a standard reduction-oxidation potential of about 0.2412V versus standard hydrogen electrode (EH2 is defined as 0.0000V). The measuring resistance was determined to be 0.1 ohm. The electrodes 28, 30 and 32 were inserted into acidic liquid/by-product/deionized water mixture such that the surface area of the working electrode 28 immersed in the mixture was about 25 sq. cm.

A difference of potential of about −0.50 V was applied between the working electrode 28 and the reference electrode 30 for about 20 minutes, with the corrosion potential of the platinum working electrode 28 versus the calomel reference electrode 30 being about +0.802V. The larger the potential difference, the larger is the Pt deposition current, and the higher is the Pt deposition rate. The current flowing from the potentiostat through the working electrode 28 via conductor 34, through the acidic liquid/by-product/deionized water mixture, and through the counter electrode 32 back to the potentiostat via conductor 38 was about 0.5 amps.

Figure 7:
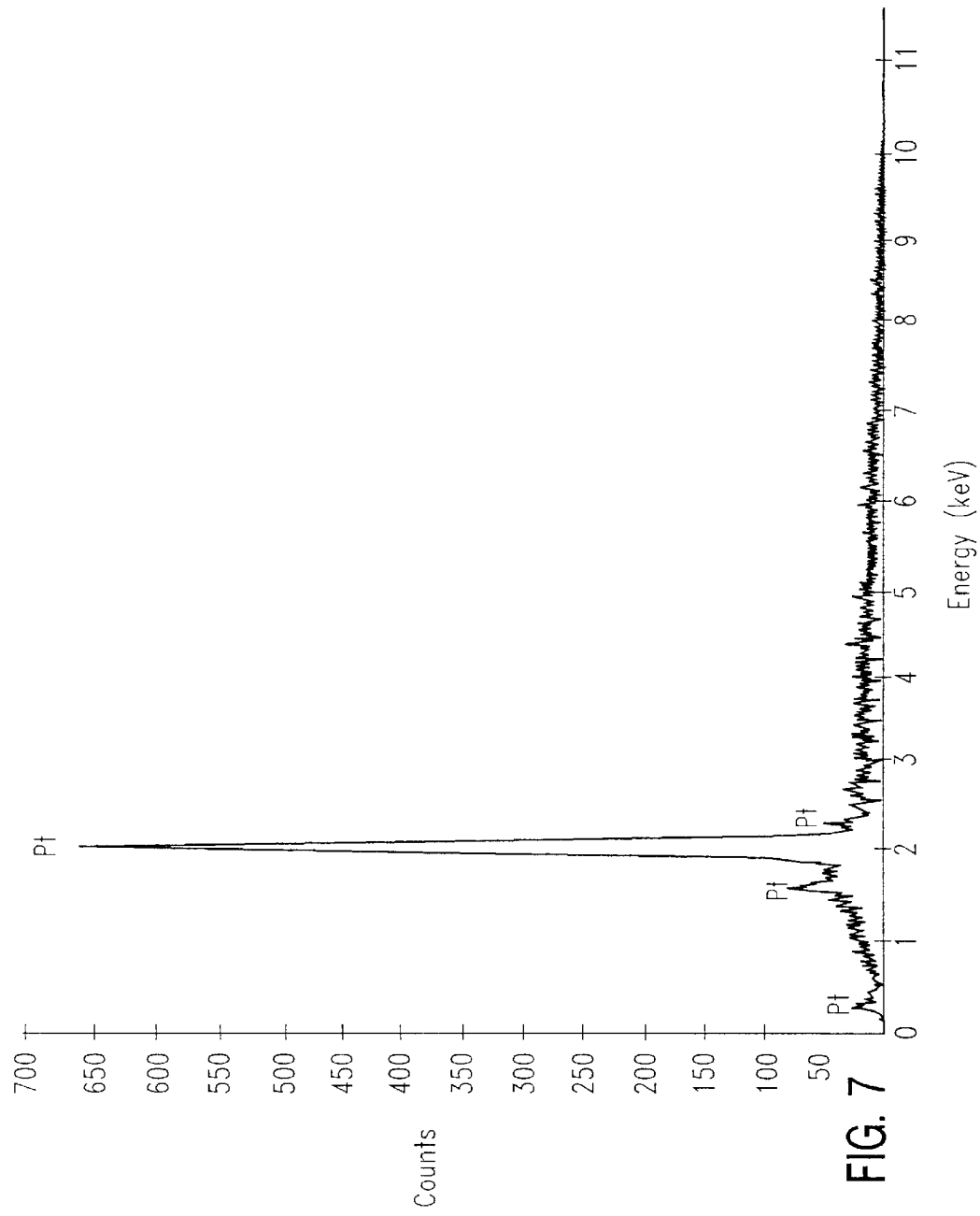
FIG. 7 is a graph of applied voltage (Energy (kV)) vs. counts for an EDS analysis of platinum recovered in the electrochemical recover process of Example I.
Figure 12:
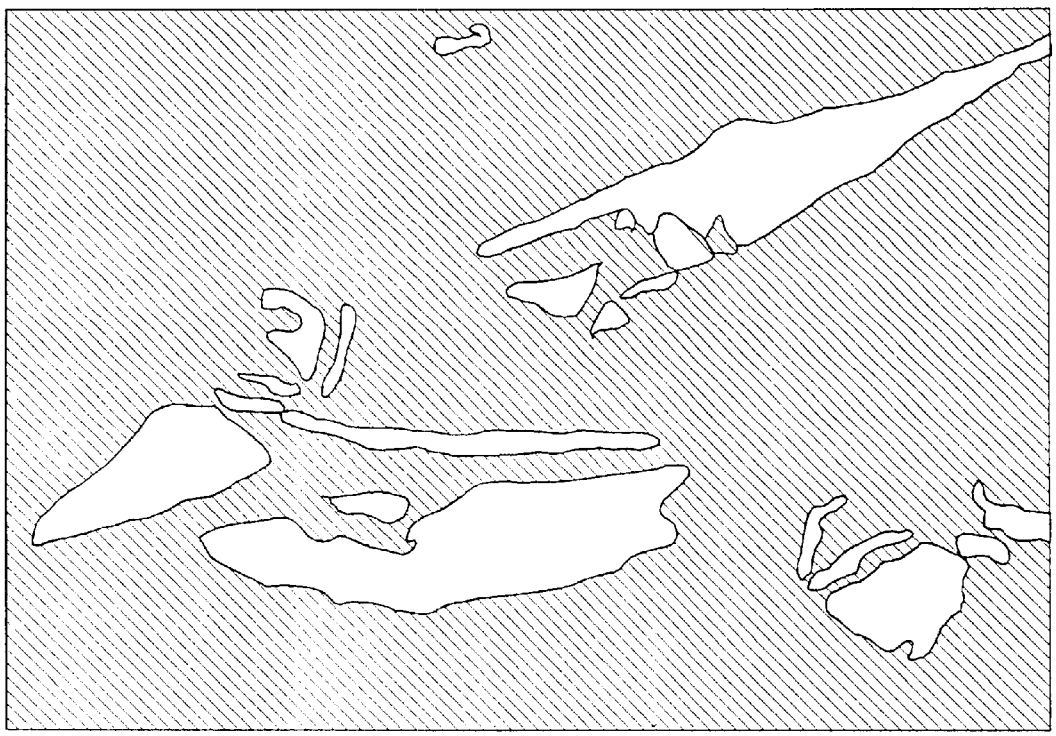
FIG. 12 is a photograph of the platinum recovered in Example I.

After about 20 minutes, the working electrode 28 was removed from the acidic liquid/by-product/deionized water mixture and had platinum metal adhered to its surface. The working electrode 28 including its associated adhered platinum was weighed, and the weight was determined to be about 1.67533 g. Thus, about 0.01968 g of platinum was removed from the acidic liquid/by-product/deionized water mixture (1.67533 g (wt. of working electrode 28 with adhered Pt)−1.65565 g (initial wt. of working electrode 28 before removing Pt from solution)=0.01968 g). The adhered platinum on the working electrode 28 may be removed from the working electrode 28 by any suitable manner, such as scraping, brushing, or the like. A picture of the removed platinum pieces is shown in FIG. 12. An EDS analysis of the recovered platinum was conducted to determine the quality of the platinum removed from the acidic liquid/by-product/deionized water mixture. EDS is energy dispersive X-ray spectrometry, well known to those skilled in the art for elemental microanalysis. As shown in FIG. 7, the recovered platinum was pure platinum.

CONCLUSION

Therefore, by the practice of the present invention there is broadly provided an assembly and method for recovering metal from the deposition of materials (i.e. residue 12 of materials) which are electrical conductive by-products from processing (e.g. metal etching) of a substrate (i.e. semiconductor wafer 10) in a process chamber having a controlled environment in containing a plasma of a processing gas. More specifically, an assembly and an electrochemical method were used to obtain pure platinum from Pt etch by-products collected on a ceramic dome and capture ring. The Pt etch by-products contained large amounts of platinum and platinum compounds, especially when chlorine-based gases were used for Pt etching. The nature of the etch by-products depended on each process recipe and surface temperature of the ceramic dome and capture ring. The electric conductivity of the etch by-products, which changed from case to case, indicated that the exact chemical composition varied when process recipe and surface temperature changed. In order to recover pure platinum from platinum etch by-products, platinum etch by-products were first dissolved in a mixed acid solution containing both hydrochloric and nitric acids. Platinum ions exist as $Pt^{2+}$ and $Pt^{4+}$ in the solution. Complex ions such as $[PtCl_4]^{2-}$ and $[PtCl_6]^{2-}$ were also in the solution. By considering the standard reduction-oxidation potential, a saturated calomel reference electrode (SCE) was used which had the standard reduction-oxidation potential of about 0.2412V versus standard hydrogen electrode ($E_{H2}$ is defined as 0.0000V). High purity graphite electrode was used as the counter electrode, and pure platinum was used the as cathode or working electrode. A cathodic potential was applied to the cathode or working electrode and pure platinum started to deposit, which was analyzed and showed to be pure platinum.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. An assembly for recovering a metal from by-products produced in a plasma processing chamber, said assembly comprising a liquid; by-products containing a metal, wherein said byproducts were recovered from a plasma processing chamber and disposed in said liquid; an electrode assembly disposed in said liquid and including a working electrode, a reference electrode and a counter electrode, wherein said working electrode is in the shape of a cylinder formed from a conductive net or mesh, which working electrode surrounds said reference and said counter electrode; a potential change selecting means, electrically connected to said working electrode and to said reference electrode and to said counter electrode, for selecting and maintaining a desired change in potential of said reference electrode with respect to said working electrode by causing a current to flow in response to a selected desired change in potential through said working electrode and through said counter electrode of a magnitude sufficient to effect said selected desired change in potential of said reference electrode with respect to said working electrode and cause said metal to be removed from said liquid and to deposit on said working electrode.

2. The assembly of claim 1 additionally comprising a means, electrically engaged to said working electrode, for measuring a magnitude of said current flowing through said working electrode.

3. The assembly of claim 1 wherein said liquid is acidic.

4. An assembly for recovering a metal from by-products produced in a plasma processing chamber, said assembly comprising a liquid; by-products containing a metal, wherein said byproducts were recovered from a plasma processing chamber and disposed in said liquid; an electrode assembly disposed in said liquid and including a working electrode, a reference electrode and a counter electrode, wherein said working electrode is in the shape of a cylinder formed from a conductive net or mesh, which working electrode surrounds said reference and said counter electrode; and a current selecting means, electrically connected to said working electrode and to said reference electrode and to said counter electrode, for selecting and maintaining a desired current flow through said working electrode and through said counter electrode to cause said metal to be removed from said liquid and to deposit on said working electrode.

5. The assembly of claim 4 additionally comprising a difference in potential measuring means for measuring a magnitude of a difference in potential between said reference electrode and said working electrode.

6. The assembly of claim 4 wherein said liquid is acidic.

7. The assembly of claim 4 wherein said metal is a noble metal.

8. The assembly of claim 4, wherein said working electrode comprises platinum.

9. An apparatus for removing metals from an aqueous solution containing by-products produced in and recovered from a plasma processing chamber, said apparatus comprising:

an electrode assembly disposed in said solution, said electrode assembly comprising a working electrode, a reference electrode, and a counter electrode, wherein said working electrode is in the shape of a cylinder formed from a conductive net or mesh, which working electrode surrounds said reference electrode and said counter electrode; and a device permitting the selection of a potential difference, said device being electrically connected to said working, reference and counter electrodes, wherein a desired potential difference between said working electrode and said reference electrode can be selected to cause an electric current to flow through said working electrode and said counter electrode, to cause said metal to be removed from said solution and deposited upon said working electrode.

10. The apparatus of claim 9, additionally comprising a measuring device electrically engaged with said working electrode, which measuring device measures the magnitude of said current flowing through said working electrode.

11. The apparatus of claim 9 wherein said aqueous solution is acidic.

12. An apparatus for removing metals from an aqueous solution of by-products produced in and recovered from a plasma processing chamber, said apparatus comprising:

an electrode assembly disposed in said solution, said electrode assembly comprising a working electrode, a reference electrode, and a counter electrode, wherein the working electrode is in the shape of a cylinder constructed from a netting or mesh of a conductive material, said working electrode surrounding said reference electrode and said counter electrode; and a means for selecting and maintaining a desired level of electrical current, electrically connected to said working, reference and counter electrodes, whereby a desired current flow through said working electrode and said counter electrode can be selected so as to cause said metal to be removed from said solution and deposited upon said working electrode.

13. The apparatus of claim 12, additionally comprising a means, electrically engaged to said working electrode, for measuring the potential difference between said working electrode and said reference electrode.

14. The apparatus of claim 12, wherein said working electrode comprises a ferrous metal or an alloy thereof.

15. The apparatus of claim 12, wherein said working electrode comprises a noble metal alloy thereof.

16. The apparatus of claim 15, wherein said noble metal is platinum or iridium.

* * * * *

UNITED STATES PATENT AND TRADEMARK OFFICE
CERTIFICATE OF CORRECTION

PATENT NO. : 6,413,389 B1
APPLICATION NO. : 09/467295
DATED : July 2, 2002
INVENTOR(S) : Shih et al.

It is certified that error appears in the above-identified patent and that said Letters Patent is hereby corrected as shown below:

IN THE CLAIMS:
Column 19, line 19, after "electrode" please delete ".".
Column 19, line 23, after "electrode" please delete ".".
Column 19, line 40, after "electrode" please delete ".".
Column 19, line 44, after "electrode" please delete ".".
Column 19, line 47, after "metal" please delete ".".
Column 19, line 49, after "platinum" please delete ".".
Column 20, line 17, after "electrode" please delete ".".
Column 20, line 21, after "electrode" please delete ".".
Column 20, line 23, after "acidic" please delete ".".
Column 20, line 41, after "electrode" please delete ".".
Column 20, line 45, after "electrode" please delete ".".
Column 20, line 47, after "thereof" please delete ".".
Column 20, line 49, after "metal" please insert --or an--.
Column 20, line 49, after "thereof" please delete ".".
Column 20, line 51, after "iridium" please delete ".".

Signed and Sealed this

Twenty-second Day of May, 2007

JON W. DUDAS
*Director of the United States Patent and Trademark Office*